United States Patent
Thelke et al.

(10) Patent No.: US 9,556,960 B2
(45) Date of Patent: Jan. 31, 2017

(54) SEAL RING OF A MECHANICAL SEAL ASSEMBLY HAVING PROPERTIES EXTENDING THE RUNNING TIME, AND METHOD FOR THE PRODUCTION THEREOF

(75) Inventors: Jörg Thelke, Wolfratshausen (DE); Rudolf Schicktanz, Geretsreid (DE); Joachim Otschik, Beuerberg (DE); Peter Droscher, Geretsreid (DE); Ferdinand Werdecker, Walchensee (DE); Klaus Lang, Beuerberg (DE); Thomas Keller, Geretsried (DE); Berthold Schulten, Geretsried (DE); Peter Haselbacher, Munich (DE); Rolf Johannes, Wolfratshausen (DE); Sven Meier, Gundelfingen (DE); Stefan Schnakenberg, Wittnau (DE)

(73) Assignees: EagleBurgmann Germany GmbH & Co. KG, Wolfratshausen (DE); Fraunhofergesellschaft Zur Forderung Der angewandten Forschung E.V., Munich (DE)

( * ) Notice: Subject to any disclaimer, the term of this patent is extended or adjusted under 35 U.S.C. 154(b) by 114 days.

(21) Appl. No.: 14/351,357

(22) PCT Filed: Aug. 2, 2012

(86) PCT No.: PCT/EP2012/003302
§ 371 (c)(1),
(2), (4) Date: May 21, 2014

(87) PCT Pub. No.: WO2013/053411
PCT Pub. Date: Apr. 18, 2013

(65) Prior Publication Data
US 2014/0319776 A1 Oct. 30, 2014

(30) Foreign Application Priority Data

Oct. 14, 2011 (DE) .......... 10 2011 116 162

(51) Int. Cl.
*F16J 15/34* (2006.01)

(52) U.S. Cl.
CPC ............ *F16J 15/3496* (2013.01); *F16J 15/34* (2013.01); *F16J 15/3404* (2013.01)

(58) Field of Classification Search
CPC ....... F16J 15/34; F16J 15/3484; F16J 15/3496
See application file for complete search history.

(56) References Cited

U.S. PATENT DOCUMENTS

| 4,226,429 A | 10/1980 | Sato et al. |
| 4,457,491 A * | 7/1984 | Dudman ............... F16K 5/0673 251/317 |

(Continued)

FOREIGN PATENT DOCUMENTS

| DE | 2854106 | 6/1979 |
| DE | 3820581 A1 | 12/1989 |

(Continued)

OTHER PUBLICATIONS

International Seach Report issued Nov. 12, 2012 in connection with PCT/EP2012/003302.

(Continued)

*Primary Examiner* — Kristina Fulton
*Assistant Examiner* — Nicholas L Foster
(74) *Attorney, Agent, or Firm* — Locke Lord LLP; Scott D. Wofsy

(57) ABSTRACT

A seal ring for a mechanical seal, comprising a base body, a first layer applied to a first face side of a base body, and a (Continued)

second layer applied to a second face side of the base body. At least one of the layers is configured as a slide surface of the seal ring.

13 Claims, 2 Drawing Sheets

(56) References Cited

U.S. PATENT DOCUMENTS

| | | | | |
|---|---|---|---|---|
| 4,746,268 A | * | 5/1988 | Sugimoto | F16J 15/3488 277/399 |
| 4,900,629 A | * | 2/1990 | Pitolaj | B29C 67/04 277/608 |
| 4,998,740 A | * | 3/1991 | Tellier | F16J 15/025 277/362 |
| 6,655,695 B1 | * | 12/2003 | Sund | F01D 11/003 277/358 |
| 2004/0031625 A1 | * | 2/2004 | Lin | E21B 10/25 175/371 |
| 2007/0228664 A1 | * | 10/2007 | Anand | F16J 15/3412 277/399 |
| 2008/0246228 A1 | | 10/2008 | Hanneke et al. | |
| 2010/0061676 A1 | | 3/2010 | Sugiyama et al. | |
| 2010/0259011 A1 | | 10/2010 | Otschik et al. | |

FOREIGN PATENT DOCUMENTS

| | | |
|---|---|---|
| DE | 19922665 | 11/2000 |
| DE | 202006006425 U1 | 6/2006 |
| DE | 102005052674 | 5/2007 |
| DE | 202007016868 U1 | 2/2008 |
| EP | 0365871 A1 | 5/1990 |
| EP | 0380749 | 8/1990 |
| GB | 1099142 A | 1/1968 |
| GB | 1231703 A | 5/1971 |

OTHER PUBLICATIONS

Search Report issued in priority DE Application No. 10 2011 116 162.0.

* cited by examiner

SEAL RING OF A MECHANICAL SEAL ASSEMBLY HAVING PROPERTIES EXTENDING THE RUNNING TIME, AND METHOD FOR THE PRODUCTION THEREOF

CROSS-REFERENCE TO RELATED APPLICATIONS

This application is a national stage entry of PCT/EP2012/003302 filed on Aug. 2, 2012, and claims the benefit of priority to German Application No. 10 2011 116 162.0 filed Oct. 14, 2011. The content of each of the foregoing applications is incorporated herein by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention refers to a seal ring of a mechanical seal assembly. Particularly, the invention refers to a seal ring with a base body of silicon carbide, silicon nitride, metal or tungsten carbide or carbon fiber composite material, wherein a special slide layer is formed on at least one of the faces, said slide layer qualifying the said face as a slide surface. To make the seal ring runnable, the distortion of the base body caused by the coating of the running surface of the seal ring with slide material is set by way of the targeted coating of the rear side of the base body. Owing to the special thickness and configuration of the slide layer and the coating defined relative thereto of the opposite side of the seal ring, a much longer running time of the seal is made possible. Furthermore, the present invention refers to a method for producing such a seal ring.

2. Description of Related Art

The prior art discloses mechanical seals in many different configurations, the seal rings being subjected during operation to extremely high loads that always lead to wear of the slide surfaces down to the base body. Therefore, the use of seal rings with slide surfaces based on carbon has gained importance. Owing to this carbon surface coating the mechanical seals can be used at high temperatures, but also under conditions with great temperature changes and simultaneously at great mechanical loads.

The coatings show a high resistance to wear and have excellent dry-running properties, the resistance, however, decreasing upon mechanical damage to the coating and necessitating an exchange of the seal rings. To achieve a resistance of the seal rings to damage that is as high as possible, these must be configured to be as flat as possible and the opposite ring surfaces must be formed very plane-parallel.

Furthermore, a configuration of the slide layer with a great thickness, if possible, independently of the material and under otherwise constant good adhesion and wear characteristics, has a positive effect on the damage behavior because more wear material is available and the running time of the seal is thereby prolonged considerably.

To improve the wear resistance, it is known from DE 199 22 665 that a three-dimensional body is coated with fine-crystalline diamond, which body may be configured as a seal ring and has a base body made of SiC.

Moreover, it has been suggested in the prior art in DE 20 2006 006 425 that the base body of a seal ring is provided with an additional substrate layer between base body and diamond layer.

Furthermore, DE 20 2007 016 868 discloses a seal ring in which diamond particles are introduced as additional material into the base body consisting of a two-component material. As a result, the coating consisting of a diamond-containing material is anchored at the base body in an improved way.

It is true that diamond coatings with an inherently high strength have the advantage that they make the correspondingly coated slide body more resistant to thermally and mechanically caused stresses or stress variations. In general, however, there is the drawback that it is difficult to produce them with the maximum quality required for mechanical seals, that they require an extremely high quality test rate and that they are extremely expensive on account of the coating material and also because of the quality control and that their use requires precise calculations.

Apart from the cost-specific drawbacks, the high coating temperatures of about 700° C. which are typical of diamond coatings present problems. During the coating process and in response to the thermal expansion coefficient of the base body to be respectively coated, these temperatures cause distortions and irregularities on the base body that in cooperation with the slide pairs have a negative effect in the seal.

Therefore, SiC rings have so far preferably been coated because the thermal expansion coefficients of SiC with about $4*10^{-6}/K$ and of the diamond coating with about $1*10^{-6}/K$ are relatively similar at room temperature and converge further when the temperature is raised.

A further possibility of providing rings with slide-improving properties is surface coating with the so-called DLC or also "diamond like carbon" layers.

DE 38 20 581 is e.g. known from the prior art; it starts from a thickness of the DLC layer on the seal ring of up to 10 μm.

US 2010/0061676 describes a mechanical seal to be used in ultrapure water, which specifies a DLC layer thickness of at least 1 μm, but not more than 5 μm.

On the whole, the coating of slide bodies with hydrocarbon layers is described in general and specifically with DLC layers and constitutes prior art.

And although this coating is represented as prior art, relatively thick hydrocarbon layers on slide bodies pose great problems. It is known from practice that great layer thicknesses always cause problems because relatively thick DLC layers create increased stresses. Like in the case of layer systems, these may in general occur only in the base body, only in the coating, preferably between base body and coating or in a different form in all of the said regions at the same time.

Moreover, all publications have in common that only one surface of the seal ring is qualified as a slide surface. Since in all coating processes the ring to be coated rests on a surface, only one side of the ring is in general coated. This creates a relatively small layer thickness because in the coating process with hydrocarbon layers the base body is heated, which causes distortions of the ring.

BRIEF SUMMARY OF THE INVENTION

It is therefore the object of the present invention to provide a seal ring and a method which following a coating operation exhibits no distortion and shows a high plane-parallelism on the slide surface.

This object is achieved with a seal ring having the features of recited in the claims appearing herein, each of the sub-claims showing preferred developments of the invention.

The seal ring according to the invention for a mechanical seal with the features of claim 1 has the advantage that a distortion of the seal ring after a coating operation can be avoided and specifically the slide surface shows high flatness, so that a seal gap of the mechanical seal can be very small. This is achieved according to the invention in that a coating is respectively applied to the two face sides of the base body oriented in axial direction of the seal ring. At least one of the layers applied serves as a slide surface of the seal ring. An asymmetric deformation of the seal ring and particularly of the base body can be avoided by coating the base body on both sides. Specifically, the distortion found in the prior art can be compensated in the case of a coating on only one side at the side of the seal ring provided with the coating in that the opposite side of the seal ring is coated. Hence, the seal ring according to the invention further shows a high plane parallelism of the two face sides oriented in axial direction, each comprising a coating. The coating on both sides is set such that there will be no distortion of the seal ring and that use under extreme loads is thereby possible with a longer running time. The configuration of the slide layer preferably with a great thickness, if possible, under otherwise constantly good adhesion and wear properties has a positive effect on the damage behavior because more wear material is available and the running time of the seal is thus considerably increased. The first and the second layer on the seal ring are here chosen such that a geometrical change caused by the first layer on the base body is compensated by a change in the geometry of the base body that has been caused by the second layer. A particularly good compensation is achieved when preferably both layers consist of the same material and have further preferably the same thickness. Alternatively, it is also possible that the two layers consist of different materials which preferably comprise different thermal expansion coefficients. A different thickness of the different materials can then also be provided on the base body because a compensation of the distortions is also achieved by the different thermal expansion coefficients.

Preferably, the seal ring is without any coating on at least one surface oriented in radial direction of the seal ring. A geometrical compensation by a layer radially arranged on the seal ring is thereby not influenced.

Likewise, it is preferably possible that the side of the seal ring which is formed as a slide surface has an above-average thickness, i.e., it is made thicker than the other layer on the other side, because the coating on the opposite side with a second layer can counteract the distortion of the ring. The same material as on the slide surface can be used, but also a different material with a correspondingly adapted thermal expansion coefficient. As a consequence, the layer on the opposite side need not automatically be provided with a very great thickness as well, but can be made thinner in response to the thermal expansion coefficient of the coating material. Further preferably, the thinner the counter layer with respect to the slide layer, the greater must be the thermal expansion coefficient of the counter layer material to compensate for the distortion. Preferably, a thermal expansion coefficient of the second layer is greater than a thermal expansion coefficient of the first layer when the second layer is thinner than the first layer. Further preferably, a thermal expansion coefficient of the first layer is in a range of 0.1 to 100 times the thermal expansion coefficient of the second layer. Further preferably, in a multilayer structure the thermal expansion coefficients of the individual layers are chosen such that these get smaller or greater with an increasing distance of the layer from the base body. Further preferred is the configuration of an individual layer with gradients e.g. with respect to the density because the hardness, for example, is gradually influenced thereby in a single layer.

For a producibility of the seal ring that is as cost-efficient as possible, the base body is preferably provided with single-layer coatings only, i.e., at each of the face sides of the base body only one single layer is directly applied to the base body. Particularly preferably, a DLC layer which is directly applied to the base body is applied with a minimum thickness of 6 μm as a single-layer coating. Alternatively, however, plural layers (multilayer structure) can be applied to a face side of the base body or a combination of coatings in such a manner that a single layer is applied at a face side of the seal ring and a multilayer coating is applied at the opposite side of the base body. Particularly preferably, two or three single layers are applied in a multilayer structure. Further preferably, a very thin adhesive layer and/or a carrier layer may also be provided between the layer and the base body or, in the case of a multilayer structure, between adjacent layers.

Particularly preferably, the seal ring is provided on both face sides with layers that are configured as a slide surface. Apart from the long running time due to the slide-improving coating, this ring can simply be turned upon damage to the one slide surface owing to the slide layer on both sides and further operated with the other slide surface. Thus the ring side that has so far not been in slide contact becomes the slide side and the side already run on is no longer used as the slide surface during the further running time of the ring. Under cost aspects a double use is thus possible in addition to the long running duration because both running surfaces of the seal ring are simultaneously formed as slide surfaces. Hence, the seal ring coated on both sides with slide surfaces can be used as a reversing or turnover seal ring.

Furthermore, the present invention relates to a mechanical seal assembly comprising at least one seal ring according to the invention, which is preferably gas-lubricated.

The seal ring according to the invention preferably consists of a functional body/substrate which consists of a base body and of a coating, preferably of a carbon layer, particularly a hydrogenous amorphous carbon layer, a so-called a-C:H layer.

The base body consists particularly of silicon carbide, silicon nitride, metal or tungsten carbide or carbon fiber composite material, wherein all other coatable materials suited as seal ring can also be used in general. The selected materials must be suited in terms of coatability, i.e., there must be a certain basic adhesion and the surface must be cleanable without reacting with the surface of the slide member to be cleaned. Specifically, electrically conductive materials must be chosen for the base body to be coated because a high coating quality is thereby achieved. Likewise, non-conductive materials are possible and the coating process must then be adapted thereto.

Further preferably, the invention relates to a method for producing a seal ring in which a first layer is applied to a base body at a first face side and a second layer at a second face side. At least one of the two layers and preferably both layers are provided as slide layers of the seal ring. The second layer is here applied in a targeted manner such that changes in a geometry of the base body that were caused by the application of the first layer are compensated at least in part, particularly completely. Hence, a seal ring can be produced with high plane-parallelism. Further preferably, the two layers are simultaneously applied to the base body. Preferably, the thickness of the two layers is here identical. Further preferably, the layer applied is a DLC coating.

Preferably, a surface oriented in radial direction of the seal ring is not coated.

Further preferably, the coatings are chosen such that a defined distortion of the seal ring, particularly a defined crowning, can be set.

The manufacture of the base body is carried out separately from the coating, and the base body is conditioned for the coating process. The conditioning is carried out with respect to flatness, adhesion and surface topography.

BRIEF DESCRIPTION OF THE SEVERAL VIEWS OF THE DRAWINGS

Preferred embodiments of the invention will now be described in detail with reference to the accompanying drawing, in which.

DETAILED DESCRIPTION OF THE INVENTION

Figure 1:
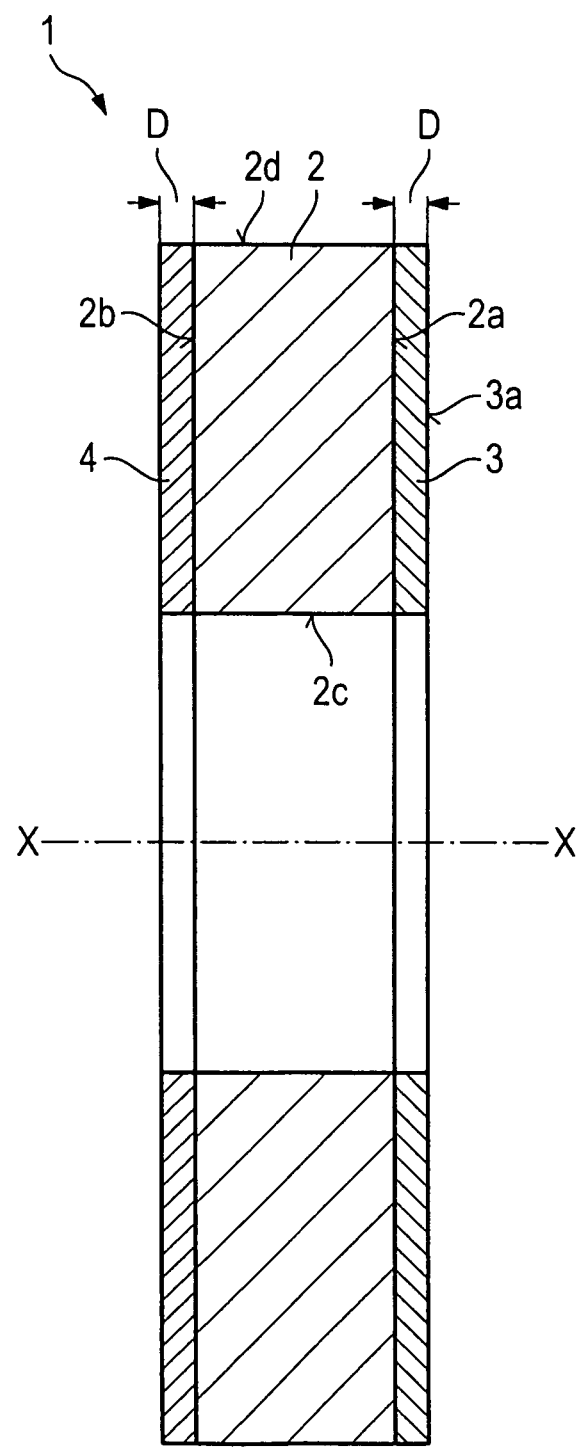
FIG. 1 is a schematic sectional view of a seal ring according to a first embodiment of the invention.

The first embodiment shown in FIG. 1 shows a seal ring 1 with a base body 2, a first layer 3, and a second layer 4. The first layer 3 is arranged on a first face side 2a of the base body 2, which is oriented in axial direction X-X. The second layer 4 is arranged on a second face side 2b oriented opposite to the first face side 2a. The two layers 3, 4 have an identical thickness D. Furthermore, as is apparent from FIG. 1, an inner circumferential surface 2c and an outer circumferential surface 2d of the base body 2 is without any coating.

In this embodiment, the first layer 3 is formed as a slide layer and thereby has a slide surface 3a. Owing to the application of coatings on both sides to the two face sides of the base body 2 an undesired distortion of the base body can be avoided during the coating process. Especially a distortion in axial direction X-X, which might lead to irregularities on the slide surface 3a, is avoided owing to the inventive idea of applying a coating on both sides. Preferably, both layers 3, 4 are made from the same material, so that the second layer 4 also provides a slide surface. It is then e.g. possible that after a certain period of use during which the first slide surface 3a is worn, the seal ring 1 is just turned over and the slide surface on the second layer 4 is then used.

Figure 2:
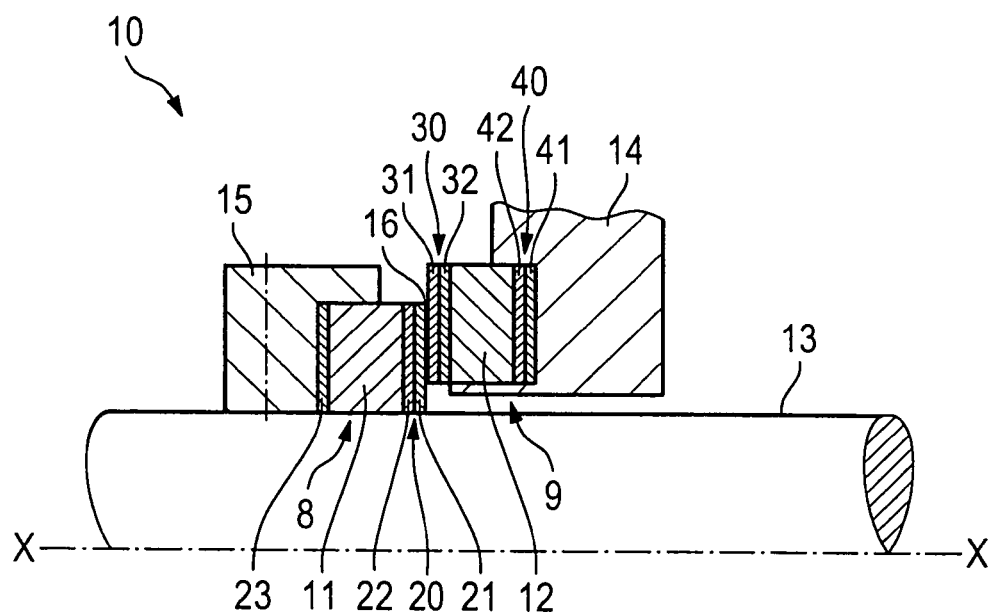
FIG. 2 is a schematic sectional view of a mechanical seal assembly with seal rings according to a second embodiment of the invention.

FIG. 2 shows a mechanical seal 10 with a rotating seal ring 8 and a stationary seal ring 9 according to a second embodiment of the invention. Both seal rings 8, 9 also have a two-sided coating and define a seal gap 16 thereinbetween in a known manner. The mechanical seal 10 of this embodiment is configured as a gas seal.

As can be seen from FIG. 2, the rotating seal ring 8 comprises a base body 11 having a face side with a multi-layer structure 20 that is oriented towards the seal gap 16. The multilayer structure 20 comprises a first layer 21 and a second layer 22, the first layer 21 being the outer layer and being thus configured as the slide surface of the seal ring. An individual third layer 23 is arranged on the opposite face side of the rotating seal ring 8. The individual layer 23 and the first layer 21 of the multilayer structure 20 are preferably made from the same material. The rotating seal ring 8 is fixed by means of a coupling sleeve 15, or the like, to a shaft 13.

The stationary seal ring 9 is arranged on a housing 14 and comprises a base body 12, a first multilayer structure 30 and a second multilayer structure 40 which are arranged on opposing faces of the base body 12. The first multilayer structure 30 comprises a first layer 31 as the slide surface and a second layer 32 arranged between the first layer 31 and the base body 12. The second multilayer structure 40 also comprises a first layer 41 and a second layer 42 arranged between the first layer 41 and the base body 12. Alternatively, like on the rotating seal ring 8, a multilayer structure may also be provided on one of the face sides, and only one single layer may be provided on the other face side.

The layer which is configured as a slide surface is here preferably a DLC layer with a thickness of at least 6 μm. Thin adhesive layers may also be applied for better adhesion of the layers to the base body or, in the case of the multilayer structure, between the layers.

LIST OF REFERENCE NUMERALS 1 seal ring
2 base body
2a first face side
2b second face side
2c inner circumferential surface
2d outer circumferential surface
3 first layer
3a slide surface
4 second layer
8 rotating seal ring
9 stationary seal ring
10 mechanical seal
11, 12 base body
13 shaft
14 housing
15 coupling sleeve
16 seal gap
20 multilayer structure
21 first layer (slide surface)
22 second layer
23 third layer
30 multilayer structure
31 first layer (slide surface)
32 second layer
40 multilayer structure
41 first layer (slide surface)

42 second layer
D thickness
X-X center axis

The invention claimed is:

1. A seal ring for a mechanical seal, comprising:
   a base body,
   a first layer applied to a first face side of a base body, and
   a second layer applied to a second face side of the base body, wherein at least one of the layers is configured as a slide surface of the seal ring,
   wherein a change in a geometry of the base body caused by the first layer is compensated at least in part by a change in the geometry of the base body caused by the second layer,
   wherein the first and second layers are multi-layered,
   wherein the first and second layers are DLC layers, and
   wherein an adhesive layer, including of at least one of hydrogenous amorphous carbon layers, tetrahedral hydrogenous amorphous carbon layers, modified hydrogenous amorphous hydrocarbon layers or metal-containing hydrogenous amorphous hydrocarbon layers, is provided in between at least one of:
   (i) the first layer and the base body,
   (ii) the second layer and the base body, or
   (iii) neighboring layers of at least one of the first and second layers.

2. The seal ring according to claim 1, wherein at least one surface of the seal ring, oriented in radial direction of the seal ring, is without at least one of the first or second layers.

3. The seal ring according to claim 1, wherein the first and second layers consist of the same material, or the first and second layers consist of different materials.

4. The seal ring according to claim 1, wherein the base body comprises silicon carbide, silicon nitride, metal carbide, tungsten carbide or carbon fiber composite material.

5. The seal ring according to claim 1, wherein the first and second layer are each formed as a slide surface.

6. The seal ring according to claim 1, wherein a thickness of the first layer corresponds to a thickness of the second layer.

7. The seal ring according to claim 1, wherein the second layer has a thermal expansion coefficient differing from the thermal expansion coefficient of the first layer.

8. The seal ring according to claim 1, wherein a thickness of the layer formed as a slide surface is between 0.1 µm and 50 µm.

9. A mechanical seal assembly, comprising a seal ring according to claim 1.

10. The seal ring according to claim 1, wherein a thickness of the layer formed as a slide surface is between 1 µm to 40 µm.

11. The seal ring according to claim 1, wherein a thickness of the layer formed as a slide surface is between 2 µm to 30 µm.

12. The seal ring according to claim 1, wherein a thickness of the layer formed as a slide surface is between 3 µm to 40 µm.

13. The seal ring according to claim 1, wherein a thickness of the layer formed as a slide surface is and further particularly 6 µm.

* * * * *